Sept. 28, 1937.   E. X. SCHMIDT   2,094,192
METHOD OF AND APPARATUS FOR PROPORTIONING AND MIXING COMBUSTIBLE FLUIDS
Filed April 8, 1935   2 Sheets-Sheet 1

Inventor
Edwin X. Schmidt
By Frank H. Hubbard
Attorney

Sept. 28, 1937.  E. X. SCHMIDT  2,094,192
METHOD OF AND APPARATUS FOR PROPORTIONING AND MIXING COMBUSTIBLE FLUIDS
Filed April 8, 1935  2 Sheets-Sheet 2

Inventor
Edwin X. Schmidt
By Frank H. Hubbard
Attorney

Patented Sept. 28, 1937

2,094,192

UNITED STATES PATENT OFFICE 2,094,192

METHOD OF AND APPARATUS FOR PROPORTIONING AND MIXING COMBUSTIBLE FLUIDS

Edwin X. Schmidt, Whitefish Bay, Wis., assignor to Cutler-Hammer, Inc., Milwaukee, Wis., a corporation of Delaware Application April 8, 1935, Serial No. 15,267

16 Claims. (Cl. 48—180)

This invention relates to methods of and apparatus for proportioning and mixing combustible gases.

An object of the invention is to provide novel methods of proportioning and mixing flows of combustible gases whereby a flowing combustible gaseous mixture of predetermined heating value per unit volume is insured.

Another object is to provide novel methods of accomplishing the aforementioned desirable result under conditions of variation in certain characteristics of one of the constituent combustible fluid flows.

Another and more specific object is to provide novel methods of gas mixing control of the so-called "butane-air plant" type.

Another object is to provide methods of the aforementioned character wherein the proportioning is effected in accordance with and to compensate for variations in the specific gravity of one of the constituent fluids.

Another and more specific object is to provide methods of the aforementioned character wherein variations in the value of the specific gravity of one of the constituent fluids are measured and utilized to effect maintenance of a substantially constant heating value per unit volume of the final composite flow.

Another object is to provide simple and efficient apparatus for carrying out the methods aforementioned.

Other objects and advantages of the invention will hereinafter appear.

The accompanying drawings illustrate certain embodiments of the invention which will now be described, it being understood that the invention is susceptible of embodiment in other forms within the scope of the appended claims.

Figure 1:
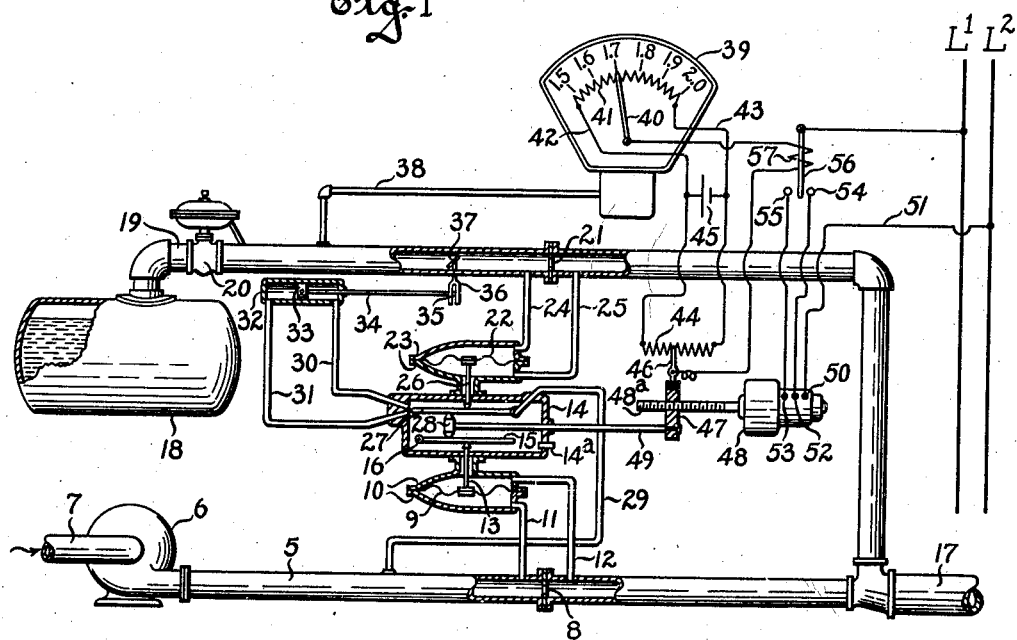

In the drawings, Figure 1 illustrates schematically and diagrammatically a gas mixing control system constructed in accordance with my invention.

Figure 2:
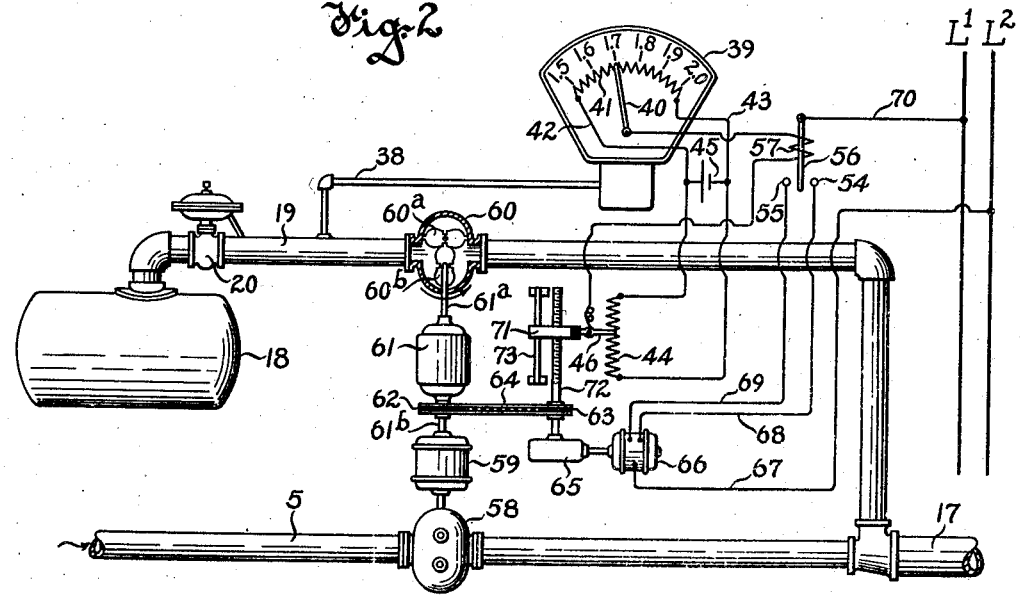
Figure 3:
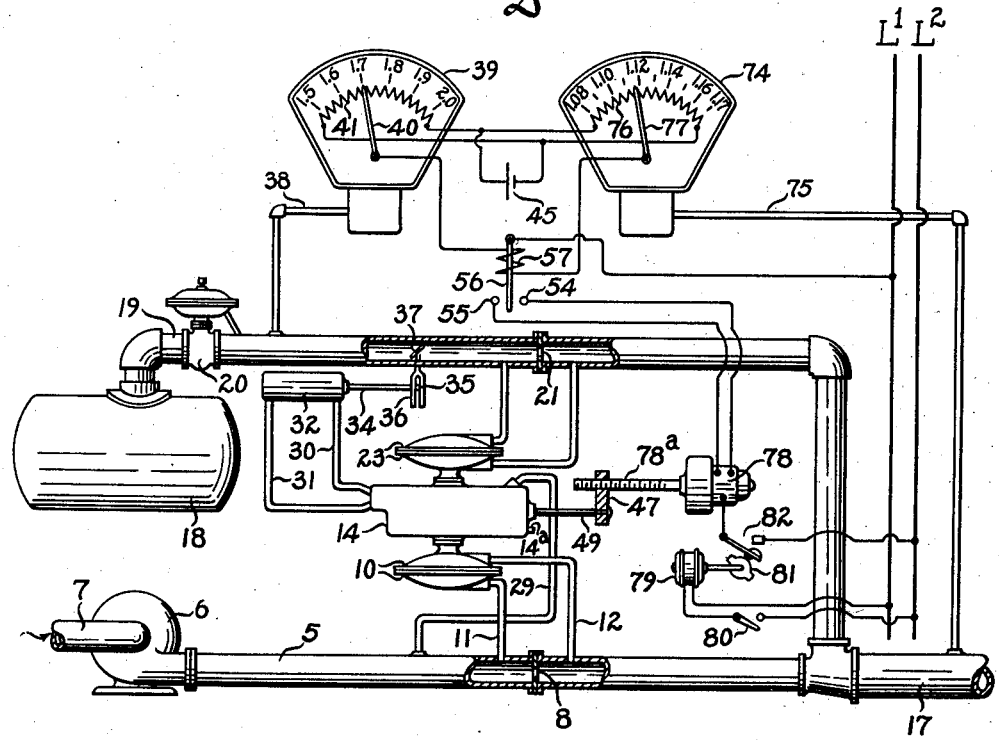

Fig. 2 illustrates schematically and diagrammatically a slightly modified form of the gas mixing control system shown in Fig. 1, and Fig. 3 illustrates schematically and diagrammatically another modified form of the gas mixing control system shown in Fig. 1,—the system of Fig. 3 providing for utilization of a pair of specific gravity meters, with the novel results hereinafter described.

It is well known that a definite relationship exists between the respective heating values per unit volume of the paraffine series gases (such as butane and propane) and the specific gravities of said gases. This relationship may be expressed by the equation: $H = 1532.7G + 142.1$; where $H$ is the heating value per unit volume of the gas at standard conditions of 32 inches of mercury (barometric pressure) and at a temperature of 60 degrees F., and $G$ is the specific gravity of the gas.

By volumetrically proportioning the vapor from butane liquid or propane liquid, or a mixture of such vapors, with air, a combustible gaseous mixture suitable for distribution in small communities may be provided. This combustible gaseous mixture should preferably have a constant heating value per unit volume. This can be accomplished by employment of a calorimetric device adapted to continuously ascertain the heating value per unit volume of the final mixture,—said calorimetric device being adapted to automatically effect proper proportioning of the constituent combustible fluid flows whereby said heating value per unit volume is maintained substantially constant. Systems of the character just mentioned are disclosed in my prior Patent No. 1,912,044, dated May 30, 1933, and in my prior Patent No. 1,933,641, dated November 7, 1933.

With my present invention, however, it is proposed to effect maintenance of a substantially constant heating value per unit volume of the final mixture in accordance with the determinations of a specific gravity meter which responds to variations in the specific gravity of the vapor per se (whether butane or propane vapor, or a mixture of such vapors). By providing for employment of a specic gravity meter or meters, instead of a calorimeter of the required degree of accuracy in operation, a substantial saving in the initial cost of the installation and in the maintenance expense may be effected.

It has heretofore been proposed to employ specific gravity meters on the final mixture for controlling the proportioning of the constituent fluids. This procedure, however, is incorrect and is likely to result in large errors in the control functions, for the reason that although a definite relationship exists between the heating value per unit volume of the final mixture and the specific gravity thereof when the specific gravity of the hydrocarbon vapor remains constant,—this latter condition is substantially unattainable in practice. As an example, a 550 B. t. u. mixture of propane vapor and air will have a specific gravity of approximately 1.0835, whereas a 550 B. t. u. mixture of butane vapor and air will have a specific gravity of 1.172. Inasmuch as a mixture of butane vapor and air having a specific gravity of 1.0835 has a heating value of only 267 B. t. u. per cubic foot, it is manifest that the method of control of proportioning as just described is subject to serious errors,—it being understood that in any given installation the specific gravity of the hydrocarbon vapor is subject to uncontrollable variations.

I have found that by employing a suitable form of differential-pressure type flow ratio control, or by employing mechanically coupled positive pressure blowers, it is possible to volumetrically proportion flows of hydrocarbon vapor and air with a fair degree of accuracy. Then by employing a specific gravity meter to continuously ascertain the specific gravity of the hydrocarbon vapor and by utilizing the operation of the specific gravity meter to effect a change in the volumetric proportioning provided by the differential-pressure type flow ratio control or by the mechanically coupled positive pressure blowers in the desired relationship to said specific gravity determination, the desired constant heating value per unit volume of the final mixture will be maintained.

Referring first to Fig. 1 of the accompanying drawings, the numeral 5 designates a conduit through which a continuous and predetermined constant volume of air or other diluting gas whose specific gravity and heating value per unit volume are lower than the specific gravity and heating value per unit volume of propane vapor is adapted to be supplied through the medium of a blower or pump 6,—which is preferably driven by an electric motor (not shown). The inlet 7 of pump 6 may be open to atmosphere, or the same may be connected with any other suitable source of supply of a fluid having the characteristics just mentioned. Conduit 5 is provided at an intermediate point in its length with a fixed orifice 8 which functions in a well known manner to produce a pressure difference or pressure drop. The value of said pressure difference is ascertained through the medium of a diaphragm 9 which is enclosed within a housing 10. A small pipe 11 provides for transmission of the fluid pressure at the upstream side of orifice 8 to the lower surface of diaphragm 9, and a small pipe 12 provides for transmission of the fluid pressure at the downstream side of orifice 8 to the upper surface of diaphragm 9. Diaphragm 9 has attached thereto a rod 13 which is slidable with a fluid-tight fit through an opening provided in the lower wall of a chamber 14,—the upper end of rod 13 being adapted to abut against a rod or lever 15 which is pivoted at its left hand end within said chamber, as indicated at 16. Conduit 5 discharges into a relatively larger conduit 17 in which the air or similar fluid supplied through conduit 5 is mixed with the hydrocarbon vapor, which is supplied in the manner now to be described,—it being understood that conduit 17 leads to a suitable point or points of use or storage of the final mixture of fluids.

The tank or container 18 may be of a suitable or desired size to satisfy the requirements of the particular installation, and it may be assumed that the same is partially filled with a volatile liquid hydrocarbon such as butane,—the space not occupied by the liquid being utilized to provide for temporary storage of the generated vapor. A conduit 19 leads from the upper end of said tank, and said conduit is provided with a well known form of valve 20 which is operable automatically to maintain a substantially constant pressure of the vapor at the downstream side of said valve. Conduit 19 is likewise provided with a fixed orifice 21, and the value of the pressure drop across said orifice is determined through the medium of a diaphragm 22 located within a housing 23, and the small pipes 24 and 25 which respectively afford communication between the upstream side of orifice 21 and the upper surface of said diaphragm and between the downstream side of orifice 21 and the lower surface of said diaphragm.

Attached to and extending downwardly from diaphragm 22 is a rod 26, the lower end of which is slidable with a fluid-tight fit through an opening provided in the upper wall of chamber 14,—said lower end of rod 26 being adapted to engage a nozzle 27 which is pivoted at its right hand end within said chamber. Interposed between and slidable with respect to the nozzle 27 and rod 15 is a disk or block 28, the position of which may be initially adjusted to provide the desired proportionality between the volumetric rates of flow of air through conduit 5 and vapor through conduit 19, and the position of which disk 28 is adjusted automatically as hereinafter described to compensate for variations in the specific gravity of the vapor flowing through conduit 19.

As shown the nozzle 27 is connected by pipe 29 with conduit 5, whereby a continuous jet of air under pressure is emitted therefrom. The air in chamber 14 is preferably vented, as by means of the relatively small pipe or opening 14ª. It is to be understood that any other suitable source of fluid under pressure might be employed for said nozzle. A pair of pipes 30 and 31 penetrate the left hand end wall of chamber 14 and have their ends arranged in close adjacency to each other,—the arrangement being such that when nozzle 27 is in an intermediate or neutral position the fluid under pressure is equally divided between the two pipes 30 and 31, whereas upon movement of the nozzle in one direction or the other from said neutral position a major portion or all of the fluid is injected into one of said pipes. Pipes 30 and 31 communicate with opposite ends of a cylinder 32 whose piston 33 is positioned automatically by the fluid under pressure, as determined by the divergence of nozzle 27 from the neutral position thereof. Attached to piston 33 is a rod 34 the hooked end 35 of which cooperatively engages the forked end of a lever 36 attached to a valve 37 located within conduit 19.

By the means aforedescribed the valve 37 is operated automatically to normally maintain a predetermined volumetric proportionality between the aforementioned fluids flowing in conduits 5 and 19. Upon attainment of the volumetric proportionality preselected for said constituent fluid flows the values of the pressure differences across the orifices 8 and 21 will bear the desired relationship to each other, and in consequence the nozzle 27 will move to its neutral position to retain the piston 33 and valve 37 in their respective adjusted positions. The system as thus far described is in general quite similar to the systems disclosed in my Patents Nos. 1,912,044 and 1,933,641 aforementioned.

However, in order to provide a substantially constant heating value per unit volume of the gaseous mixture flowing in conduit 17 I provide the following means for supplementally adjusting the valve 37. A continuous sample of the hydrocarbon vapor flowing through conduit 19 is supplied by pipe 38 to a well known form of specific gravity meter designated in general by the numeral 39. Said meter is calibrated to provide a range of measurement from 1.5 (which is substantially the specific gravity of propane) to 2.0 (which is substantially the specific gravity of butane). The indicator or pointer 40 of said meter is formed of conducting material for cooperation with a resistance element 41, the opposite ends of which are respectively connected by conductors 42 and 43 with the ends of another resistance element 44,—said conductors being respectively connected with the terminals of a battery 45 or other suitable source of direct current supply.

A contactor 46 is adapted to cooperatively engage resistance element 44, said contactor being carried by a traveling nut 47 which is adapted to be driven by the threaded shaft 48$^a$ connected with motor 48. Nut 47 has attached thereto one end of a rod 49 the other end of which is attached to the disk or block 28 aforementioned. Motor 48 is of the split-field reversible type, the common terminal 50 thereof being connected by conductor 51 with line L$^2$ of a suitable source of current supply, and the split-field terminals 52 and 53 are respectively electrically connected with the stationary contacts 54 and 55 of a polarized relay, the movable contactor 56 of which is electrically connected with line L$^1$ of said source of current supply. The operating winding 57 has its opposite ends respectively connected with the contactors 40 and 46, wherefore a Wheatstone bridge circuit is provided.

Thus it may be assumed that the parts aforedescribed are so calibrated that in the adjusted positions thereof illustrated the volumetric rate of flow of the hydrocarbon vapor through conduit 19 is so proportioned with respect to the volumetric rate of flow of air through conduit 5 as to provide a flowing mixture in conduit 17 having a heating value per unit volume of 550 B. t. u. In the event of an increase in the specific gravity of the hydrocarbon vapor flowing through conduit 19 it is necessary to definitely vary the volumetric rate of flow thereof in order to maintain the aforementioned heating value per unit volume (550 B. t. u.) of the mixture flowing in conduit 17. Accordingly upon movement of contactor 40 toward the right in response to said increase in specific gravity of the vapor, the aforementioned Wheatstone bridge circuit will be unbalanced to a corresponding degree.

It may be assumed that such unbalancing will cause engagement of the relay contactor 56 with contact 54 with resultant energization of motor 48 to effect movement of contactor 46 toward the right to effect rebalancing of the Wheatstone bridge circuit. Simultaneously with such movement of contactor 46 the disk 28 is moved toward the right to vary the ratio of the pressure differences to be maintained across the fixed orifices 8 and 21. More particularly, such adjustment will result in downward deflection of the free end of nozzle 27 with resultant movement of piston 33 toward the right to effect a predetermined degree of closing of valve 37. Such adjustment of valve 37 will so vary the volumetric proportionality between the constituent fluid flows as to provide or maintain a substantially constant heating value per unit volume of the final mixture flowing in conduit 17.

Upon a decrease in specific gravity of the vapor flowing in conduit 19 the aforedescribed elements will function in a similar manner, but in an opposite sense, to effect the required degree of opening movement of valve 37 whereby the required volumetric proportionality between the flows of hydrocarbon vapor and air is provided to produce a final mixture of the desired quality or heating value per unit volume.

As will be understood by those skilled in the art, even though butane liquid alone or propane liquid alone (of usual commercial quality or character) is employed in container 18, the vapors generated by the respective individual liquids will be subject to inherent variations in specific gravity, as the generation of vapor proceeds,—due to the fact that the more volatile constituents of the liquid are initially released at a relatively more rapid rate than the less volatile gases. As evaporation progresses the composition of the residual liquid changes so that as the tank gradually empties the vapors approximate or comprise the less volatile of the hydrocarbon gases.

My system of control not only provides for accurate control of the heating value per unit volume of the final mixture of vapor and air under these inherent conditions of variation in specific gravity of the vapor; but the same also inherently compensates for variations in the specific gravity of the vapor due to alternate use of different hydrocarbon liquids of the paraffine series, or to variations incident to use of a mixture of two or more different liquids of the aforementioned character.

As will be understood, the specific gravity meter 39 is calibrated to provide for determination of the range of specific gravities which it is contemplated shall be encountered in the particular installation. In like manner the resistances 41 and 44 are calibrated in accordance with said range of specific gravities and so arranged with reference to each other as to provide for proper control of the polarized relay aforedescribed.

The embodiment of my invention illustrated in Fig. 2 is in many respects like that shown in Fig. 1, and corresponding parts have been given like numerals of reference in the two figures. In Fig. 2 I have substituted for the pump or blower 6 of Fig. 1 a positive pressure blower or pump 58 of a well known form,—said pump being arranged to be driven at a constant speed by an electric motor 59, which may be supplied with current from lines L$^1$, L$^2$, or from any other suitable source. A volumetrically constant flow of air from conduit 5 to conduit 17 is thus effected. Located within conduit 19 is another positive pressure blower or pump 60 which may be similar in construction but preferably smaller in size than the blower 58 aforementioned.

Blower 60, as shown, is provided with a pair of rotary impellers 60$^a$, 60$^b$, which are meshed with or geared to each other. Impeller 60$^b$ is driven by a shaft 61$^a$ which is in turn driven by a suitable form of variable speed transmission gearing designated by the numeral 61. Gearing 61 is connected by shaft 61$^b$ with motor 59, whereby blowers 58 and 60 are mechanically connected with each other. The means for varying the speed of blower 60 with respect to the speed of blower 58 comprises a sprocket wheel 62 which is adapted to adjust the variable speed gearing 61 in a sense and to a degree corresponding with the direction and degree of operation of a sprocket wheel 63. Wheels 62 and 63 are connected by an endless chain 64.

Wheel 63 is adapted to be driven through the medium of suitable speed reducing gearing 65 by an electric motor 66 of the split-field reversible type. The common terminal of the field windings of motor 66 is connected by conductor 67 with line L². The individual terminals of said field windings are connected by conductors 68 and 69 with the respective stationary contacts 54 and 55 of a polarized relay of the character described in connection with Fig. 1. The movable contactor 56 of said relay is connected by conductor 70 with line L¹. The operating winding 57 of the polarized relay is electrically connected with the combined indicating arm and contactor 40 associated with resistance 41 and with the contactor 46 associated with resistance 44.

Contactor 46 is carried by a traveling nut or block 71, the position of which is controlled by the direction and amount of rotary movement of a threaded shaft 72 which is rigidly connected with the aforementioned sprocket wheel 63. Nut 71 is restrained against rotary movement, as by means of a suitable guide-bar or rod 73 with which said nut has sliding engagement. The aforedescribed elements of the Wheatstone bridge circuit are adapted to function in the manner set forth in connection with the system of Fig. 1.

Thus with the various elements shown in Fig. 2 initially adjusted to so volumetrically proportion the rate of flow of the hydrocarbon vapor (such as butane) through conduit 19 with respect to the rate of flow of air through conduit 5 as to provide a final mixture in conduit 17 of predetermined heating value per unit volume (say, 550 B. t. u.), the Wheatstone bridge circuit will be in balanced condition, and such volumetric proportionality will be maintained automatically by the operation of blowers 58 and 60 at the relative speeds thereof preselected by the adjustment of the aforementioned gearing 61.

However, upon an increase in the specific gravity of the vapor flowing in conduit 19 the combined indicator and contactor 40 of meter 39 will move toward the right to effect a given degree of unbalancing of the Wheatstone bridge circuit. Let it be assumed that the bridge circuit is unbalanced in a sense to cause engagement of the contactor 56 of the polarized relay with contact 54. This will complete a circuit from line L² through one of the field windings of motor 66, and through contact 54, contactor 56, and conductor 70 to line L¹. Motor 66 will thereupon operate in a direction to effect downward movement of the contactor 46 associated with resistance 44, and such movement will continue until the bridge circuit is brought into a balanced condition.

During such movement of contactor 46 the chain and sprocket gearing 63, 64 and 62 acts to adjust the gearing 61 to reduce the relative rate of operation of blower 60, so that upon rebalancing of the bridge circuit the volumetric rate of supply of hydrocarbon vapor by pump 60 will have been so reduced as to provide (upon mixture thereof with the air supplied by blower 58) the predetermined heating value per unit volume (550 B. t. u.) of the mixture flowing in conduit 17.

Upon a decrease in the specific gravity of the hydrocarbon vapor flowing in conduit 19 the combined contactor and indicator 40 will be moved toward the left to effect unbalancing of the bridge circuit in an opposite sense from that aforedescribed. Consequently the polarized relay contactor 56 will be engaged with the contact 55 to complete a circuit through the other field winding of motor 66,—said circuit extending from line L² by conductor 67 through said other field winding, by conductor 69 to contact 55 and contactor 56, and by conductor 70 to line L¹. Motor 66 is thus operated in a direction to effect upward movement of contactor 46 with respect to resistance 44 whereby the bridge circuit is rebalanced,—the aforementioned gearing 63, 64, 62 acting simultaneously to effect adjustment of gearing 61 whereby the rate of operation of blower 60 is increased to increase the volumetric rate of supply of the hydrocarbon fluid by blower 60 with reference to the volumetric rate of supply of air by blower 58. The result of the adjustments aforedescribed is that the heating value per unit volume of the final mixture flowing through conduit 17 is maintained substantially constant.

In Fig. 3 I have shown another modification of the gas mixing control system illustrated in Fig. 1. Many of the parts shown in Fig. 1 are utilized in constructing the system shown in Fig. 3, and such parts have been given like numerals of reference. In Fig. 3 I have shown an additional specific gravity meter 74 which communicates by piping 75 with conduit 17 to provide for continuously ascertaining the specific gravity of the mixture of hydrocarbon vapor and air flowing in said conduit.

Meter 74 is calibrated to indicate a range of values between 1.08 at the left (which is approximately the specific gravity of a proper mixture of propane vapor and air, having a total heating value per unit volume of 550 B. t. u.) and 1.17 at the right (which is approximately the specific gravity of a proper mixture of butane vapor and air, having a total heating value per unit volume of 550 B. t. u.). Meter 74 has associated therewith a resistance element 76 and an indicating arm 77 which acts as a cooperating contactor for said resistance. Resistances 41 and 76, contactors 40 and 77 and the operating winding 57 of the polarized relay are arranged in the form of a Wheatstone bridge circuit, which includes the battery 45.

As in the devices aforedescribed, the contactor 56 of the polarized relay is adapted upon unbalancing of the bridge circuit to engage contact 54 or contact 55, to effect operation of a motor 78 in one direction or the other,—said motor through its threaded shaft 78ª being adapted to effect movement of nut 47 in one direction or the other. Nut 47 in turn effects adjustment of rod 49 to vary the ratio of the pressure drops to be maintained across orifices 8 and 21 respectively,—such adjustment resulting in a corresponding direction and degree of movement of the piston within cylinder 32, whereby the elements 34, 35 and 36 effect the required direction and degree of adjustment of valve 37.

In a device of the character disclosed in Fig. 3 I prefer to employ an additional small motor 79 which may be connected, by a manually operable switch 80, across lines L¹, L². Motor 79 carries a rotatable cam member 81 which is arranged to effect alternate closure and opening of a switch 82, whereby the circuit of motor 78 is alternately completed and interrupted during engagement of the polarized relay contactor 56 with one or the other of the contacts 54 or 55. The primary purpose of switch 82 is to insure adjustment of valve 37 intermittently or in steps, whereby a given adjustment thereof is permitted to take effect in respect of a variation in the specific gravity of the mixture of fluids flowing in conduit 17 prior to a repeated operation of motor 78.

As will be apparent upon careful consideration of meter 39 the same is calibrated to indicate at the left hand side the specific gravity of propane vapor (1.5) and at the right hand side the specific gravity of butane vapor (2.0), with intermediate indicating points to measure the value of various mixtures of these hydrocarbon vapors. In like manner the meter 74 is calibrated to indicate at the left hand side the specific gravity (1.08) of a proper mixture of propane vapor and air and at the right hand side the specific gravity (1.17) of a proper mixture of butane vapor and air,—the intermediate values corresponding with the specific gravities of proper mixtures of propane and butane vapors jointly with air to provide a composite fluid having the aforementioned heating value per unit volume of 550 B. t. u. The values of resistances 41 and 76 are properly calibrated and related to each other, and the arrangement of the Wheatstone bridge parts is such that the contactors 40 and 77 must have like angular positions to effect balancing of the bridge circuit.

More particularly, with the parts in the positions thereof illustrated in Fig. 3, let it be assumed that the specific gravity of the hydrocarbon vapor flowing in conduit 19 changes to 2.0 (which is the specific gravity of butane vapor). The contactor 40 will thereupon move to the extreme right hand end of resistance 41, with consequent unbalancing of the bridge circuit.

Due to the last mentioned change in the specific gravity of the vapor flowing through conduit 19, the volumetric rate of flow thereof through orifice 21 will be slightly reduced. Within a very short period of time the specific gravity of the flowing mixture of gases in conduit 17 will change. Inasmuch as there is a slight time delay before the specific gravity meter 74 can act to show the resulting change in the specific gravity of the mixture flowing through conduit 17, the motor 78 will have begun to adjust the ratio of the flow through conduit 19 (in this instance effecting movement of valve 37 toward closed position). Shortly thereafter the specific gravity meter 74 will act to show the actual specific gravity of the mixture flowing through conduit 17, and from that time on motor 78 will operate the media aforedescribed to effect adjustment of valve 37 until indirectly, through the change in ratio of the pressure drops across orifices 21 and 8, the heating value per unit volume flowing in conduit 17 is again of the desired or predetermined value. As aforeindicated attainment of the last mentioned result will be indicated by corresponding angular positioning of the contactors 40 and 77 of specific gravity meters 39 and 74.

From the foregoing it will be apparent that the system disclosed in Fig. 3 not only compensates for variations in the specific gravity of the hydrocarbon vapor supplied, but also compensates for any inaccuracies or imperfections in the mechanical means for effecting volumetric proportioning of the hydrocarbon vapor and air. For instance, if the orifice 8 in conduit 5 should become further restricted due to corrosion, accumulation of dust or other sediment, etc., the resulting decrease in the volumetric rate of flow of air would affect the value of the specific gravity of the mixture flowing in conduit 17, and the resultant movement of contactor 77 would effect a corresponding degree of unbalancing of the Wheatstone bridge circuit. As a result the motor 78 would be operated in the manner aforedescribed to effect the required direction and degree of adjustment of valve 37 to provide for rebalancing the bridge circuit, as an incident to restoration of the required value of the specific gravity of the mixture flowing in conduit 17.

The operation of the system shown in Fig. 3 in the event of a decrease in the specific gravity of the hydrocarbon vapor flowing in conduit 19 should be apparent from the foregoing description. In such an event the contactor 40 of meter 39 would move toward the left to a degree corresponding with the change. The resulting unbalancing of the bridge circuit would cause intermittent operation of motor 78 to gradually effect opening movement of valve 37, and such adjustment would be stopped automatically upon movement of contactor 77 toward the left to an angular position corresponding with that of contactor 40,—thus indicating and insuring attainment of the proper value of the specific gravity of the mixture flowing in conduit 17. The operating advantages of the system illustrated in Fig. 3 will be apparent to those skilled in the art.

In the several systems herein disclosed it is contemplated that the pressure of the vapor flowing in conduit 19 shall be definitely proportional to, and preferably equal to, the pressure of air flowing in conduit 5. In practice I prefer that each flow of fluid shall be at substantially atmospheric pressure.

It is to be understood that the specific gravity meters herein disclosed are of a type adapted to be subjected to the gravity effect of a continuously flowing sample of the test fluid. The sample, when tested, may be burned, or discharged to atmosphere or returned in any suitable manner to the main flow of hydrocarbon vapor.

What I claim as new and desire to secure by Letters Patent is:

1. In a gas mixing control system, in combination, a branch conduit through which a hydrocarbon vapor of the paraffine series is adapted to flow, another conduit through which air is adapted to flow, a main conduit into which said branch conduits discharge to provide for mixture of said flows of vapor and air and to provide for conveying the composite fluid so produced to a point or points of use or storage, means for initially proportioning the volumetric rates of flow of vapor and air to provide a composite fluid of a preselected heating value per unit volume, means for continuously ascertaining the instantaneous value of the specific gravity of the hydrocarbon vapor, and means responsive to variations in said instantaneous value with respect to a predetermined value to effect a corresponding variation in the volumetric rate of flow of said hydrocarbon vapor, to thereby maintain a substantially constant heating value per unit volume of said composite fluid.

2. In a gas mixing control system, in combination, a branch conduit through which a hydrocarbon vapor of the paraffine series is adapted to flow, another conduit through which air is adapted to flow, a main conduit into which said branch conduits discharge to provide for mixture of said flows of vapor and air and to provide for conveying the composite fluid so produced to a point or points of use or storage, means for initially proportioning the volumetric rates of flow of vapor and air to provide a composite fluid of a preselected heating value per unit volume, means for continuously ascertaining the instantaneous value of the specific gravity of the hydrocarbon vapor, means responsive to variations in said instantaneous value with respect to a predetermined value to effect a corresponding variation in the volumetric rate of flow of said hydrocarbon vapor, means for continuously ascertaining the instantaneous value of the specific gravity of said composite fluid, means for ascertaining the difference between the value last mentioned and the proper value of the specific gravity of said composite fluid as determined by the ascertained value of the specific gravity of said hydrocarbon vapor, and means for effecting a further variation in the volumetric rate of flow of said hydrocarbon fluid in accordance with and to compensate for said difference, whereby a substantially constant heating value per unit volume of said composite fluid is maintained.

3. In a gas mixing control system, in combination, a pair of branch conduits through which constituent gaseous fluids are respectively adapted to flow, a main conduit into which said branch conduits discharge to provide a flowing mixture of said fluids, a relatively small pipe through which flows a fluid under pressure, each of said branch conduits having a fixed orifice located therein, devices adapted to respond to the differential value of the pressure drops across said orifices for effecting movement of said relatively small pipe in one direction or the other, means including a valve located in one of said branch conduits and movable toward open or closed position through the medium of said fluid under pressure escaping from said relatively small pipe to normally maintain a predetermined ratio between the pressures to be regulated, means including an adjustable device for varying the ratio between the pressures aforementioned, and means operable automatically for effecting adjustment of said device, said last mentioned means including means operable to continuously ascertain and to compensate for variations in the instantaneous value of the specific gravity of one of said constituent gaseous fluids, the value of the specific gravity of the other of said constituent gaseous fluids being constant, whereby the heating value per unit volume of said mixture of fluids is maintained substantially constant.

4. In a gas mixing control system, in combination, a branch conduit through which a hydrocarbon vapor of the paraffine series is adapted to flow, another branch conduit through which air is adapted to flow, a main conduit into which said branch conduits are adapted to jointly discharge to provide a composite flow of fluid, means for initially volumetrically proportioning said flows of vapor and air to provide a composite fluid flow of predetermined heating value per unit volume, means for continuously ascertaining the instantaneous value of the specific gravity of said vapor flow, and means responsive to variations in said specific gravity with respect to a preselected value to automatically effect corresponding variations in the volumetric rates of flow of said vapor and said air relatively to each other, whereby the heating value per unit volume of said composite fluid flow is maintained substantially constant.

5. In a gas mixing control system, in combination, a branch conduit through which a hydrocarbon vapor of the paraffine series is adapted to flow, another branch conduit through which air is adapted to flow, a main conduit into which said branch conduits are adapted to jointly discharge to provide a composite flow of fluid, means for positively proportioning said flows of vapor and air to initially provide a composite fluid of predetermined heating value per unit volume, means including a specific gravity meter for continuously ascertaining the instantaneous value of the specific gravity of said vapor, and associated electrical means controlled by said meter for automatically varying the relative volumetric rate of flow of said vapor in accordance with and to compensate for variations in the specific gravity of the latter, whereby the heating value per unit volume of said composite fluid flow is maintained substantially constant.

6. Apparatus for making combustible gas, comprising a container, a quantity of volatile liquid hydrocarbon of the paraffine series located within said container, means for controllably venting the vapor generated in said container to provide a vapor flow at a substantially constant predetermined pressure, means for effecting a substantially constant volumetrically proportional rate of flow of air for mixture with said vapor, means for continuously ascertaining the instantaneous value of the specific gravity of said vapor flow, and means to automatically vary the relative volumetric rate of flow of said vapor in response to and to compensate for variations in the value of the specific gravity thereof with respect to a predetermined value, whereby the heating value per unit volume of the flowing mixture of vapor and air is maintained substantially constant.

7. In a gas mixing control system, in combination, means for effecting a continuous and volumetrically constant flow of air at a predetermined pressure, means for effecting a continuous flow of a hydrocarbon vapor of the paraffine series, the volume and pressure of said vapor flow being definitely proportional to the volume and pressure of said flow of air, means for effecting a flowing mixture of said flows of air and vapor to provide a composite fluid of predetermined heating value per unit volume, means for continuously ascertaining the value of the specific gravity of said vapor flow, means for varying the volumetric rate of flow of said vapor relatively to the volumetric rate of flow of said air in response to and to compensate for variations in the value of the specific gravity of said vapor with respect to a preselected value, whereby the heating value per unit volume of said composite fluid is normally maintained substantially constant, means for continuously ascertaining the instantaneous value of the specific gravity of said composite fluid, means for continuously comparing said last mentioned value with the value of the specific gravity of said flow of vapor, and associated means to further vary the volumetric rate of flow of said vapor to maintain a predetermined relationship between the values of said specific gravities, to thereby maintain a proper relationship between the volumetric rates of flow of the hydrocarbon vapor and air under all conditions.

8. Apparatus for proportioning and mixing gaseous fluids to provide a combustible gaseous mixture of substantially constant heating value per unit volume, which comprises a branch conduit, means for effecting a substantially constant volumetric rate of flow of air through said conduit, a second branch conduit, means for effecting a flow of a hydrocarbon vapor of the paraffine series through said second conduit, an adjustable valve in said second conduit, said valve being initially adjusted to so volumetrically proportion the rate of flow of said vapor with respect to said rate of flow of air as to provide a composite flow of fluid of predetermined heating value per unit volume upon mixture of said vapor and air, a third conduit into which said branch conduits jointly discharge to produce said composite flow of fluid, means including a fixed orifice in each of said branch conduits and differential pressure responsive means associated with said orifices for effecting automatic operation of said valve to normally maintain a predetermined volumetric proportionality between the rates of flow of air and vapor, means including a specific gravity meter for continuously ascertaining the value of the specific gravity of the vapor flowing in said second conduit, means including a Wheatstone bridge circuit associated with said specific gravity meter, means for effecting unbalancing of said Wheatstone bridge circuit in a sense and to a degree corresponding with the variation in the value of said specific gravity with respect to a predetermined value, a polarized relay responsive to the operation of said Wheatstone bridge circuit, and a reversible electric motor controlled by said polarized relay, said motor being operable automatically to effect adjustment of said differential pressure responsive means to thereby effect a corresponding adjustment of said valve, whereby the volumetric proportionality of said flows of vapor and air is varied in accordance with and to compensate for variations in the value of the specific gravity of said vapor, to thereby maintain a substantially constant heating value per unit volume of said composite flow of fluid.

9. Apparatus for proportioning and mixing gaseous fluids to provide a combustible gaseous mixture of substantially constant heating value per unit volume, which comprises a branch conduit, means for effecting a substantially constant volumetric rate of flow of air through said conduit, a second branch conduit, means for effecting a flow of a hydrocarbon vapor of the paraffine series through said second conduit, an adjustable valve in said second conduit, said valve being initially adjusted to so volumetrically proportion the rate of flow of said vapor with respect to said rate of flow of air as to provide a composite flow of fluid of predetermined heating value per unit volume upon mixture of said vapor and air, a third conduit into which said branch conduits jointly discharge to produce said composite flow of fluid, means including a fixed orifice in each of said branch conduits and differential pressure responsive means associated with said orifices for effecting automatic operation of said valve to normally maintain a predetermined volumetric proportionality between the rates of flow of air and vapor, means including a specific gravity meter for continuously ascertaining the value of the specific gravity of the vapor flowing in said second conduit, means including a second specific gravity meter for continuously ascertaining the value of the specific gravity of said composite flow of fluid, a Wheatstone bridge circuit having complementary parts thereof respectively associated with said specific gravity meters, a polarized relay subject to control by said Wheatstone bridge circuit, a reversible electric motor subject to control by said polarized relay, means for effecting adjustment of said differential pressure responsive means according to the direction and degree of operation of said motor to thereby effect a corresponding adjustment of said valve, means for effecting unbalancing of said Wheatstone bridge circuit in response to a given operation of said first mentioned specific gravity meter, and means for effecting re-balancing of said Wheatstone bridge circuit upon a corresponding operation of said second mentioned specific gravity meter, to thereby insure maintenance of a substantially constant heating value per unit volume of said composite flow of fluid under all conditions.

10. Apparatus for proportioning and mixing gaseous fluids to provide a combustible gaseous mixture of substantially constant heating value per unit volume, which comprises a branch conduit, means for effecting a substantially constant volumetric rate of flow of air through said conduit, a second branch conduit, means for effecting a flow of a hydrocarbon vapor of the paraffine series through said second conduit, an adjustable valve in said second conduit, said valve being initially adjusted to so volumetrically proportion the rate of flow of said vapor with respect to said rate of flow of air as to provide a composite flow of fluid of predetermined heating value per unit volume upon mixture of said vapor and air, a third conduit into which said branch conduits jointly discharge to produce said composite flow of fluid, means including a fixed orifice in each of said branch conduits and differential pressure responsive means associated with said orifices for effecting automatic operation of said valve to normally maintain a predetermined volumetric proportionality between the rates of flow of air and vapor, means including a specific gravity meter for continuously ascertaining the value of the specific gravity of the vapor flowing in said second conduit, means including a second specific gravity meter for continuously ascertaining the value of the specific gravity of said composite flow of fluid, a Wheatstone bridge circuit having complementary parts thereof respectively associated with said specific gravity meters, a polarized relay subject to control by said Wheatstone bridge circuit, a reversible electric motor subject to control by said polarized relay, means for effecting adjustment of said differential pressure responsive means according to the direction and degree of operation of said motor to thereby effect a corresponding adjustment of said valve, means for effecting unbalancing of said Wheatstone bridge circuit in response to a given operation of said first mentioned specific gravity meter, and means for effecting rebalancing of said Wheatstone bridge circuit upon a corresponding operation of said second mentioned specific gravity meter, to thereby insure maintenance of a substantially constant heating value per unit volume of said composite flow of fluid under all conditions, the aforementioned means including means operable automatically for effecting adjustment of said valve in steps in response to unbalancing of said Wheatstone bridge circuit by said specific gravity meter first mentioned, to thereby provide for ascertainment of the specific gravity of said composite flow of fluid by said second mentioned specific gravity meter prior to a further adjustment of said valve.

11. The method of making combustible gas, which comprises effecting a continuous flow of air at a predetermined pressure, effecting a continuous flow of a hydrocarbon vapor of the paraffine series the specific gravity of which is subject to inherent variations, the volume and pressure of said vapor flow being definitely proportioned with respect to volume and pressure, respectively, of said flow of air, initially effecting a flowing mixture of said flows of air and vapor to provide a composite fluid of predetermined heating value per unit volume, continuously ascertaining the instantaneous value of the specific gravity of said vapor flow, and utilizing variations in the instantaneous value of the specific gravity of said vapor with respect to a preselected value to effect corresponding variations in the relative volumetric rates of flow of said vapor and said air, whereby the heating value per unit volume of said composite fluid is maintained substantially constant.

12. The method of making combustible gas, which comprises depositing within a closed container a volatile liquid hydrocarbon of the paraffine series, controllably venting the vapor generated in said container to initially provide a predetermined volumetric rate of vapor flow at a substantially constant predetermined pressure, the specific gravity of said vapor being subject to inherent variations, effecting a substantially constant volumetrically proportional rate of flow of air for mixture with said vapor, continuously ascertaining the instantaneous value of the specific gravity of said vapor flow, and utilizing variations in the instantaneous value of the specific gravity of said vapor flow with respect to a predetermined value to effect corresponding variations in the relative volumetric rate of flow of said vapor, whereby the heating value per unit volume of the flowing mixture of vapor and air is maintained substantially constant.

13. The method which comprises effecting a continuous and volumetrically constant flow of air at a predetermined pressure, effecting a continuous flow of a hydrocarbon vapor of the paraffine series the specific gravity of which is subject to inherent variations, the volume and pressure of said vapor flow being initially definitely proportional to the volume and pressure, respectively, of said flow of air, effecting a flowing mixture of said flows of air and vapor to provide a composite fluid of predetermined heating value per unit volume, continuously ascertaining the instantaneous value of the specific gravity of said vapor flow, and utilizing variations in the instantaneous value of the specific gravity of said vapor with respect to a preselected value to effect corresponding variations in the volumetric rate of flow of said vapor relatively to the volumetric rate of flow of said air, whereby the heating value per unit volume of said composite fluid is maintained substantially constant.

14. The method which comprises effecting a continuous and volumetrically constant flow of air at a predetermined pressure, effecting a continuous flow of a hydrocarbon vapor of the paraffine series the specific gravity of which is subject to inherent variations, the volume and pressure of said vapor flow being definitely proportional to the volume and pressure, respectively, of said flow of air, initially effecting a flowing mixture of said flows of air and vapor to provide a composite fluid of predetermined heating value per unit volume, continuously ascertaining the instantaneous value of the specific gravity of said vapor flow, utilizing variations in the instantaneous value of the specific gravity of said vapor with respect to a preselected value to effect corresponding variations in the volumetric rate of flow of said vapor relatively to the volumetric rate of flow of said air, whereby the heating value per unit volume of said composite fluid is normally maintained substantially constant, continuously ascertaining the instantaneous value of the specific gravity of said composite fluid, continuously comparing said last mentioned value with the value of the specific gravity of said flow of vapor, and utilizing the difference in said values to effect a further variation in the volumetric rate of flow of said vapor to maintain a predetermined relationship between the values of said specific gravities, to thereby maintain a proper relationship between the volumetric rates of flow of the hydrocarbon vapor and air under all conditions.

15. The method of mixing combustible gases to provide a combustible mixture having a predetermined substantially constant heating value per unit volume regardless of inherent variations in the specific gravity of said mixture, which comprises effecting a predetermined substantially constant volumetric rate of flow of air, effecting an initially volumetrically proportioned flow of a hydrocarbon vapor of the paraffine series the specific gravity of which is subject to inherent variations, effecting a mixture of said vapor and air to provide a composite fluid of predetermined heating value per unit volume, continuously ascertaining the instantaneous value of the specific gravity of said hydrocarbon vapor, and utilizing variations in the value of said specific gravity with respect to a predetermined value to substantially simultaneously effect corresponding variations in the volumetric rate of flow of said vapor, whereby the heating value per unit volume of said composite fluid is maintained substantially constant.

16. The method of mixing combustible gases to provide a combustible mixture having a predetermined substantially constant heating value per unit volume regardless of inherent variations in the specific gravity of said mixture, which comprises effecting a predetermined substantially constant volumetric rate of flow of air, effecting an initially volumetrically proportioned flow of a hydrocarbon vapor of the paraffine series the specific gravity of which is subject to inherent variations, effecting a mixture of said vapor and air to provide a composite fluid of predetermined heating value per unit volume, continuously ascertaining the instantaneous value of the specific gravity of said hydrocarbon vapor, utilizing variations in the instantaneous value of said specific gravity with respect to a predetermined value to substantially simultaneously effect corresponding variations in the volumetric rate of flow of said vapor, whereby the heating value per unit volume of said composite fluid is maintained substantially constant, predetermining the proper value of the specific gravity of said composite fluid to be maintained in respect of each given value of the specific gravity of said hydrocarbon vapor, continuously ascertaining the instantaneous value of the specific gravity of said composite fluid, and utilizing variations in said last mentioned value with respect to said predetermined proper value to effect corresponding further variations in the volumetric rate of flow of said hydrocarbon vapor, to thereby compensate for any possible inaccuracies in the volumetric proportioning of said hydrocarbon vapor and air.

EDWIN X. SCHMIDT.